United States Patent Office 2,848,673
Patented Aug. 19, 1958

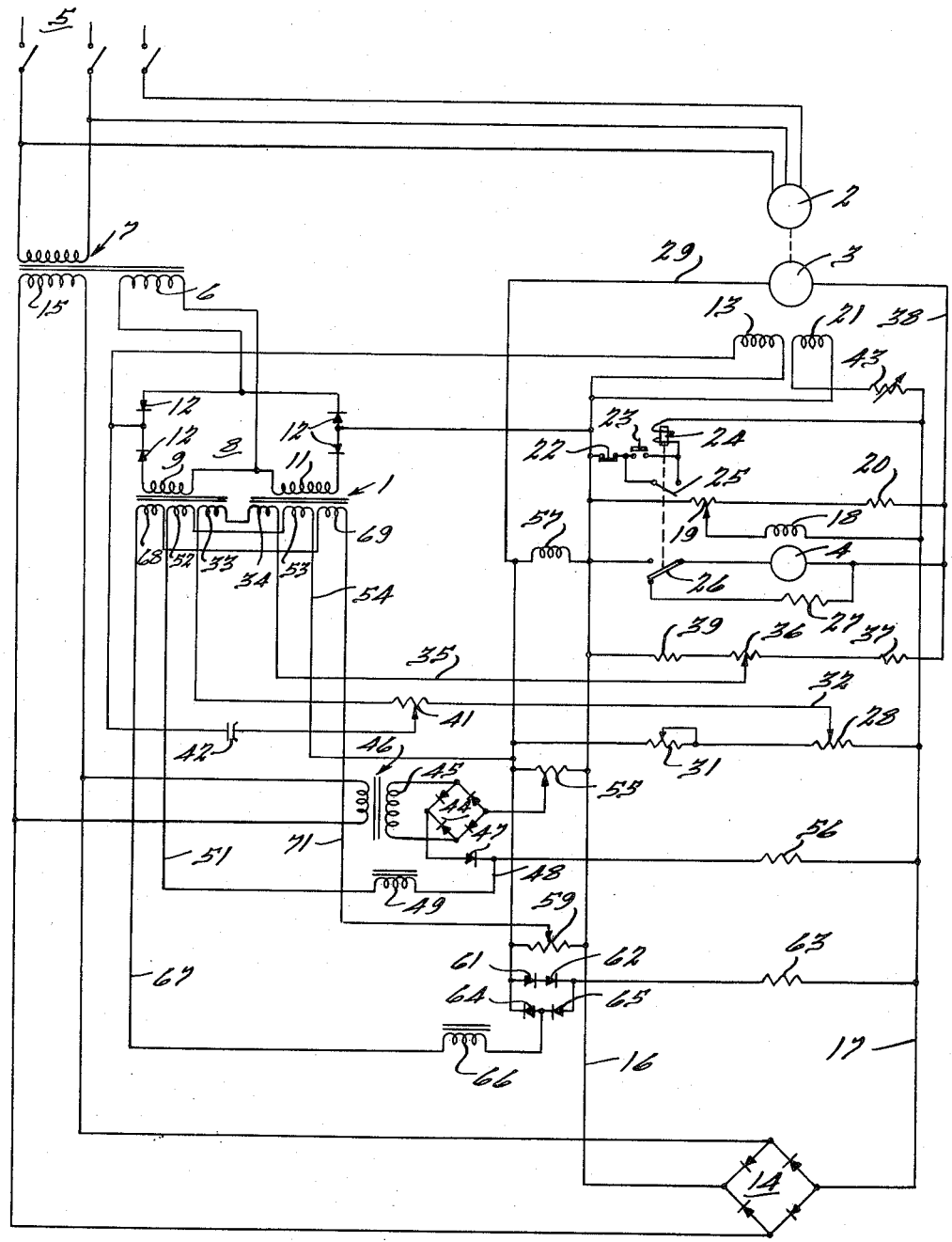

2,848,673

MAGNETIC AMPLIFIER MOTOR CONTROL

Dorn L. Pettit, Milwaukee, and Charles C. Gould, Brookfield, Wis., assignors to Square D Company, Detroit, Mich., a corporation of Michigan Application July 28, 1954, Serial No. 446,248

16 Claims. (Cl. 318—143)

This invention relates to a magnetic amplifier motor control and more particularly to a magnetic amplifier regulated exciter for an adjustable speed drive in which the adjusted speed is maintained constant by the magnetic amplifier.

An object of the present invention is the provision of an improved magnetic amplifier motor control for a motor-generator system of the Ward Leonard type in which speed control is effected by opposing a constant D. C. motor field voltage by at least part of the variable armature voltage over the entire speed range, while varying the generator field.

Another object of the invention is a magnetic amplifier motor control in accordance with the preceding object which also compensates for fluctuating line voltage and the IR drop within the circuit.

Another object of the invention is an improved magnetic amplifier motor control for a motor-generator system in which the rate of change of motor speed is limited by a predetermined maximum armature current limit.

Another object of the invention is an improved magnetic amplifier motor control for a motor-generator system in which motor speed is controlled by opposing a constant D. C. motor field voltage by at least part of the variable armature voltage over the entire speed range and limiting the rate of variation in generator field to vary the motor speed by a predetermined maximum armature current limit.

Further objects and features of the invention will be readily apparent to those skilled in the art from the specification and appended drawing illustrating certain preferred embodiments in which:

The figure is a schematic drawing showing the magnetic amplifier control circuit of the present invention.

The magnetic amplifier regulator of the present invention includes a conventional saturable reactor generally designated as 1 which controls the energization of a generator in a motor generator combination unit generally known as a Ward Leonard system. The Ward Leonard system constitutes a driving motor 2, a generator 3 and a controlled motor 4. The present invention relates to magnetic amplifier control circuits which automatically effect the control of the controlled motor by adjusting the output of the generator. The control of the generator output is effected by controlling its field excitation in accordance with the desired adjusted motor speed.

In the control of the field excitation of the generator in the present invention, the magnetic amplifier 1 is excited from a source of alternating current at 5 through the secondary winding 6 of a transformer 7, with the excitation voltage being applied across two terminals of a rectifier bridge 8 having primary windings 9 and 11 of the magnetic amplifier 1 in each leg of the bridge. The bridge circuit includes four rectifier units 12 which convert the applied A. C. voltage to D. C. voltage required for excitation of the generator field 13. The load current through each of the windings 9 and 11 of the magnetic amplifier 1 will be pulsating half-wave pulses from the excitation alternating current due to the rectifying action of the bridge rectifier 8. This load current, when applied to the field winding 13 of the generator 3, will be filtered to a substantially steady excitation of the field due to the inductance of the field causing the generator to develop an output voltage which will be applied to the armature and field of the controlled motor through controlling circuits now to be described.

The motor field excitation is developed by another bridge rectifier 14 excited from the line voltage 5 through a secondary winding 15 of the transformer 7 and the output of the rectifier is applied through conductors 16 and 17 to the field winding 18 through the adjustable resistor 19. According to the present invention, speed control of the motor 4 is effected by simultaneously weakening the motor field as the generator field is increased. This is effected by bucking the constant D. C. voltage from rectifier bridge 14 by a portion of the armature output of generator 3. The adjustable resistor 19 is connected in a voltage divider circuit with resistor 20 across the generator armature, the circuit including the left hand side of generator 3, line 29, commutator field winding 57, resistor 19, resistor 20 and line 38 to the right hand side of generator 3. This circuit produces a voltage drop across resistor 19 which increases and decreases with the output of generator 3. As above explained, the field winding 18 of motor 4 is fed through a portion of the adjustable resistor 19. The voltage drop through that portion of resistor 19 which is effected by flow of current from generator 3 is in opposition to and bucks the voltage supply by the bridge rectifier 14, the output of which is substantially constant. Thus, as the voltage of generator 3 is increased, the voltage drop through resistor 19 and through the portion thereof in series with field windings 18 are also increased. Therefore, since the output of rectifier 14 is constant, the increased bucking voltage through the portion of resistor 19 lowers the voltage available to energize the field winding 18 and therefore decreases the motor field to increase the motor speed beyond that which would have been occasioned by increase in motor armature voltage alone. The output of the rectifier bridge 14 is also applied through adjustable resistor 43 to a bucking field winding 21 of the generator 3 which functions to prevent generator output due to residual magnetism in the generator field. The rectifier output is also applied to the Stop button 22 and Start 23 and its associated solenoid 24 which operates contact 25 in a holding circuit and contact 26 in the armature circuit of the controlled motor. The contact arm 26 in deenergized position connects a dynamic braking resistor 27 across the armature of the controlled motor 4 and disconnects the motor from the generator.

The speed selection of the present invention is provided by the adjustment of the speed control resistor 28 which may be found at some point remote from the motor-generator itself, the speed control being maintained by a comparison in the magnetic amplifier of the generator output and a reference voltage from rectifier 14 as applied to windings 33 and 34. The generator output is fed to windings 33 and 34 through the circuit of the conductor 29, adjustable minimum speed resistor 31, speed control adjustable resistor 28, conductor 32 to windings 33 and 34 of the magnetic amplifier, conductor 35, maximum voltage adjustable resistor 36, divider resistor 37 and conductor 38 to return to the generator 3. The output of the rectifier 14 is applied in the opposite direction through conductor 16, divider resistor 39, maximum voltage adjustable resistor 36, conductor 35, windings 34 and 33 of the magnetic amplifier, through conductor 35 and conductor 32 to the speed adjustment resistor 28 to conductor 17 and back to the rectifier 14. This voltage comparison circuit introduces a feedback voltage in the control winding 33, 34 of the magnetic amplifier 1 in bucking relation to the reference signal voltage so that what difference voltage may exist is available to cause saturating current to flow through the control winding. In this manner a strong regulating action is effected since the adjustment of the maximum voltage resistor 36 may be made such that there will be only a few volts difference signal applied to the magnetic amplifier to conduct the necessary saturating current. A relatively small change in the generator output voltage for any reason then causes a relatively large change in the difference between the reference and the feedback voltages and an immediate correcting change in the saturation of th magnetic amplifier. This prevents or minimizes variations in the armature voltage supply to the motor, and, consequently its speed, due to such variables as the generator armature and field resistances, variation in the magnetic amplifier output with supply voltage variations, and variations in the residual flux in the generator following extreme load currents. The variation in the motor field, which may be minimized by maintaining the field near saturation, and in the reference signal voltage with supply line variations are not eliminated by the armature voltage feedback. However, these may be minimized by additional compensating circuits to be described hereinafter.

A damping adjustment is provided in an adjustable damping resistor 41 to which is applied any fluctuations in the generator output as picked off by the capacitor 42 which is connected to the output of the magnetic amplifier on one side and through the damping adjustment resistor 41, conductor 32, speed adjustment resistor 28, adjustable bucking field resistor 43, bucking field winding 21 to the other side of the magnetic amplifier.

An additional control winding of the magnetic amplifier is used to provide a bias in the magnetic amplifier's control characteristic which is so adjusted that minimum amplifier output to the generator field occurs when the current in the main control winding, which performs the regulation described thus far, is zero. This additional control winding and the current flowing therethrough is not varied by the speed adjuster resistor 28 and, since the amplifier output is determined by the sum of all the ampere turns in the magnetic amplifier, it has the effect of shifting the operating control of the magnetic amplifier. The current that is passed through these control windings is adjusted to just cancel out the ampere turns of the magnetizing current drawn by the amplifier windings on the primary side of the magnetic amplifier, which are rectified by the power rectifiers and which would otherwise cause saturation of the amplifier. These windings serve the additional purpose of insuring that failure in the continuity of the control winding or the control circuits as energized from the magnetic amplifier speed regulator, as for instance, a failure of a contact relay or a wiper of the speed adjustment resistor, will cause the speed of the regulated motor to drop to a minimum and thereby insure unwanted increases in speed. The current for this bias winding is drawn from an additional rectifier bridge 44 energized from the secondary 45 of a transformer 46 energized from the power source 5. The output of the rectifier bridge 44 is applied through an additional rectifier 47, which operates effectively as though it were a battery by providing a constant voltage drop, then through conductor 48 and choke 49 which filters off ripple from the rectifier 44 then through conductor 51 to windings 52 and 53 then through conductor 54 to and through the IR compensation adjustment resistor 55 and back to the rectifier. A bleeder resistor 56 also draws current through the rectifiers 44 from the voltage reference supply rectifier 14. The voltage drop across rectifier 47 is such as to decrease the bias voltage supplied to the bias winding of the magnetic amplifier. Since the voltage drop across the rectifier 47 remains substantially constant, any proportional variations of the output of the rectifier 44 with the line voltage changes will cause magnified changes in the bias current and the biasing action of the windings 52 and 53 in the magnetic amplifier will shift the operating characteristic of the magnetic amplifier sufficiently due to this line voltage change to compensate for the inherent change in the output of the magnetic amplifier with the voltage change and will also compensate for changes in the reference voltage supply from rectifier 14. The operation of this bias winding 52, 53 effects a minimization of the variations in the generator output voltage and resulting motor speed which would occur with changes in supply voltage.

Additional compensation is provided for the IR drop in the generator and motor circuit for increased loads. To provide for this compensation, the rheostat 55 is also connected across the commutating field 57 of the generator 3 so as to receive a voltagt drop which is proportional to the load current drawn by the motor and is of a polarity to reduce the bias current as load current increases, that is, as the load current increases through the commutating field winding 57 a portion of that current is shunted through the resistor 55 and develops a voltage drop across the resistor which is bucking to the voltage developed by rectifier 44 and, consequently, the increased load current reduces the current through windings 52 and 53 of the magnetic amplifier 1 to thereby reduce the negative ampere turns developed by these windings.

An additional control circuit according to this invention is provided for limiting the deceleration current and accelerating current flowing in the armature circuit when speed settings are increased or decreased suddenly. To accomplish this, another adjustable resistor 59 is connected across the commutating field winding 57 so as to develop a voltage drop thereacross which is proportional to the load current of the controlled motor 4. A bias current is drawn through the adjustable resistor 59 from the reference supply voltage rectifier 14 through conductor 16, resistor 59, rectifiers 61 and 62 and resistor 63 to conductor 17 and back to the rectifier 14. Rectifiers 61 and 62 operate as constant voltage drop devices to maintain a constant voltage across their terminals. Connected across the terminals of the rectifiers 61 and 62 are rectifiers 64 and 65 and, from the junction of these two rectifiers, a filter choke 66 is connected through conductor 67 to the windings 68 and 69 of the magnetic amplifier and thence through conductor 71 to the adjustable slider of the resistor 59.

The biasing current from the reference voltage rectifier 14 develops a voltage drop across the rectifiers 61 and 62 which is constant and is adjusted by resistor 59 to be equal to and opposite to the voltage drop across the commutating field winding 57 at maximum desired current. When acceleration or steady load increases beyond the limit set by the adjustment of resistor 59, the bias voltage will be exceeded by the voltage drop across the commutating field 57 and current will be conducted through the rectifiers 61 and 62 and through rectifier 65 through choke 66, conductor 67, windings 68 and 69, and conductor 71 to the adjustable resistor 59 and back to the commutator field winding negative terminal. This current in flowing through the windings 68 and 69 flows in a direction to decrease the saturation of the magnetic amplifier and is strong enough to overcome the regulating action of the regulation windings 33 and 34 since the resistance of these windings 68 and 69 is relatively small. The generator field current is thereby prevented from increasing too rapidly so as to limit the armature current flow through the generator and motor while the motor is accelerating. When the speed increases to a point where armature current is below limit, the feedback of the armature voltage permits the regulating winding to resume control, and the armature current decreases to the amount required by the running load.

If the speed setting is decreased suddenly, the controlled motor 4 begins to operate as a generator and develops a voltage drop across the commutating field winding 57 of the generator 3 in a direction to pass current through the adjustable resistor 59, conductor 71, windings 69 and 68, conductor 67, choke 66 and rectifier 64 to the opposite side of the commutator field. This current is in the saturating direction through the magnetic amplifier and effectively increases the saturation in the rectifier and prevents weakening of the generator field too rapidly so that deceleration current is limited to a low value until the new preset speed is reached.

It is thus seen that applicants' magnetic amplifier control is a simple and effective system for controlling motor speed by simultaneously weakening the motor field as the generator field is strengthened, over the entire range, and for limiting the maximum armature current by controlling the rate of change of the fields regardless of how rapid may be a change in field setting and while certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, circuit means for applying a constant D. C. voltage to the motor field for energization thereof and means in said circuit means for opposing said motor field energizing voltage by at least part of said generator output voltage whereby change in the generator field and output effects a simultaneous and opposite change in the motor field.

2. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, a voltage divider circuit across the generator output, a constant voltage source, and means for energizing the motor field from said constant voltage source and through a portion of said voltage divider circuit having a voltage drop in opposition to the source whereby change in generator field and output effects a simultaneous and opposite change in the motor field.

3. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, a constant voltage source, a resistor connected across the generator output and to one terminal of said source, and means connecting the motor field to the other terminal of said source and to an intermediate point on said resistor so that energization of said motor field will vary inversely with generator output.

4. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, means establishing a voltage proportional to armature current, means for applying a constant biasing voltage across said establishing means opposing said last voltage, a second control winding on said magnetic amplifier connected to be energized by an unbalance between said established voltage and said biasing voltage to control generator armature current.

5. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, means establishing a voltage proportional to armature current, means including a rectifier for applying a constant biasing voltage across said establishing means opposing said last mentioned voltage, means for adjusting said biasing voltage to a desired current limit value, a second control winding on said magnetic amplifier, and means for energizing said control winding by an unbalance between said established voltage and said biasing voltage to control generator armature current.

6. In an adjustable speed motor control circuit, a motor-generator system, a magnetic amplifier having a power winding and a control winding, means supplying a reference voltage, a feed back circuit for comparing said reference voltage and the generator output voltage and energizing said control winding by the difference therebetween to vary the output through said power winding, means for energizing the generator field through said power winding, means establishing a voltage proportional to armature current, means including a rectifier establishing a biasing voltage normally opposing said armature current voltage, a resistor connected in series with said rectifier and in parallel with said voltage establishing means, a pair of serially connected rectifiers across said first rectifier, a second control winding and means connecting said second control winding between an intermediate point on said resistor and the midpoint between said pair of serially connected rectifiers for decreasing and increasing the saturation of the magnetic amplifier as the armature current exceeds a predetermined value when the motor is accelerating and decelerating, respectively.

7. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the different therebetween to vary the output through said power winding, means for energizing the generator field through said power winding, an adjustable resistor, means applying a biasing voltage drop to said resistor through a first rectifier section, means applying a normally opposing voltage drop to said resistor proportional to armature current, a pair of rectifiers connected across said first rectifier section, a second control winding connected between an intermediate point on said resistor and the midpoint between said pair of rectifiers so as to be energized upon increase in armature current beyond a limit set by said adjustable resistor and in a direction to prevent excessive current.

8. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, means applying a constant D. C. voltage to the motor field for energization thereof, means opposing said motor field energizing voltage by at least part of said generator output voltage whereby change in the generator field and output effects a simultaneous and opposite change in the motor field, means establishing a voltage proportional to armature current, means for applying a constant biasing voltage across said establishing means opposing said last mentioned voltage, a second control winding on said magnetic amplifier connected to be energized by an unbalance between said established voltage and said biasing voltage to control generator armature current.

9. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, means applying a constant D. C. voltage to the motor field for energization thereof and means opposing set motor field energizing voltage by at least part of said generator output voltage whereby change in the generator field and output effects a simultaneous and opposite change in the motor field, means establishing a voltage proportional to armature current, means including a rectifier for applying a constant biasing voltage across said establishing means opposing said last mentioned voltage, means for adjusting said biasing voltage to a desired current limit value, a second control winding on said magnetic amplifier, and means for energizing said control winding by an unbalance between said established voltage and said biasing voltage to control generator armature current.

10. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, means applying a constant D. C. voltage to the motor field for energization thereof, means opposing said motor field energizing voltage by at least part of said generator output voltage whereby change in the generator field and output effects a simultaneous and opposite change in the motor field, means establishing a voltage proportional to armature current, means including a rectifier establishing a biasing voltage normally opposing said armature current voltage, a resistor connected in series with said rectifier and in parallel with said voltage establishing means, a pair of serially connected rectifiers across said first rectifier, a second control winding, and means connecting said second control winding between an intermediate point on said resistor and the midpoint between said pair of serially connected rectifiers for decreasing and increasing the saturation of the magnetic amplifier as the armature current exceeds a predetermined value when the motor is accelerating and decelerating, respectively.

11. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, means applying a constant D. C. voltage to the motor field for energization thereof, means opposing said motor field energizing voltage by at least part of said generator output voltage whereby change in the generator field and output effects a simultaneous and opposite change in the motor field, an adjustable resistor, means applying a biasing voltage drop to said resistor through a first rectifier section, means applying a normally opposing voltage drop to said resistor proportional to armature current, a pair of rectifiers connected across said first rectifier section, a second control winding connected between an intermediate point on said resistor and the midpoint between said pair of rectifiers so as to be energized upon increase in armature current beyond a limit set by said adjustable resistor and in a direction to prevent excessive current.

12. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, a voltage divider circuit across the generator output, a constant voltage source, and means for energizing the motor field from said constant voltage source and through a portion of said voltage divider circuit having a voltage drop in opposition to the source whereby change in generator field and output effects a simultaneous and opposite change in the motor field, means establishing a voltage proportional to armature current, means establishing a biasing voltage opposing said last mentioned voltage, a second control winding on said magnetic amplifier energized when said armature current voltage exceeds said biasing voltage in a direction to decrease the generator armature current.

13. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, a voltage divider circuit across the generator output, a constant voltage source, and means for energizing the motor field from said constant voltage source and through a portion of said voltage divider circuit having a voltage drop in opposition to the source whereby change in generator field and output effects a simultaneous and opposite change in the motor field, means establishing a voltage proportional to armature current, means including a rectifier establishing a biasing voltage normally opposing said armature current voltage, a resistor connected in series with said rectifier and in parallel with said voltage establishing means, a pair of serially connected rectifiers across said first rectifier, a second control winding, and means connecting said second control winding between an intermediate point on said resistor and the midpoint between said pair of serially connected rectifiers for decreasing and increasing the saturation of the magnetic amplifier as the armature current exceeds a predetermined value when the motor is accelerating and decelerating, respectively.

14. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, a constant voltage source, a resistor connected across the generator output and to one terminal of said source, means connecting the motor field to the other terminal of said source and to an intermediate point on said resistor so that energization of said motor field will vary inversely with generator output, means establishing a voltage proportional to armature current, means establishing a biasing voltage opposing said last mentioned voltage, a second control winding on said magnetic amplifier energized when said armature current voltage exceeds said biasing voltage in a direction to decrease the generator armature current.

15. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, a voltage divider circuit across the generator output, a constant voltage source, means for energizing the motor field from said constant voltage source and through a portion of said voltage divider circuit having a voltage drop in opposition to the source whereby change in generator field and output effects a simultaneous and opposite change in the motor field, a bias winding for said magnetic amplifier, an energizing voltage source for said bias winding varying with said variations in line voltage, and a substantially constant voltage source in series with said varying voltage source and in bucking relation thereto so as to feed the bias winding with the difference between said varying and substantially constant voltages.

16. In an adjustable speed motor control circuit, a motor-generator system, a magnetic amplifier having a power winding and a control winding, means supplying a reference voltage, a feedback circuit for comparing said reference voltage and the generator output voltage and energizing said control winding by the difference therebetween to vary the output through said power winding, means for energizing the generator field through said power winding, means establishing a voltage proportional to armature current, means including a rectifier establishing a biasing voltage normally opposing said armature current voltage, a resistor connected in series with said rectifier and in parallel with said voltage establishing means, a pair of serially connected rectifiers across said first rectifier, a second control winding, means connecting said second control winding between an intermediate point on said resistor and the midpoint between said pair of serially connected rectifiers for decreasing and increasing the saturation of the magnetic amplifier as the armature current exceeds a predetermined value when the motor is accelerating and decelerating, respectively, a bias winding for said magnetic amplifier, an energizing voltage source for said bias winding varying with said variations in line voltage, and a substantially constant voltage source in series with said varying voltage source and in bucking relation thereto so as to feed the bias winding with the difference between said varying and substantially constant voltages.

References Cited in the file of this patent

UNITED STATES PATENTS

| 2,445,460 | Snyder | July 20, 1948 |
| 2,519,339 | Avery | Aug. 22, 1950 |
| 2,600,308 | Lund et al. | June 10, 1952 |
| 2,627,597 | Johansson | Feb. 3, 1953 |

FOREIGN PATENTS

| 709,835 | Great Britain | June 2, 1954 |